July 31, 1928.
F. W. DENDA
1,679,242
PARACHUTE
Original Filed Nov. 20, 1926   3 Sheets-Sheet 2
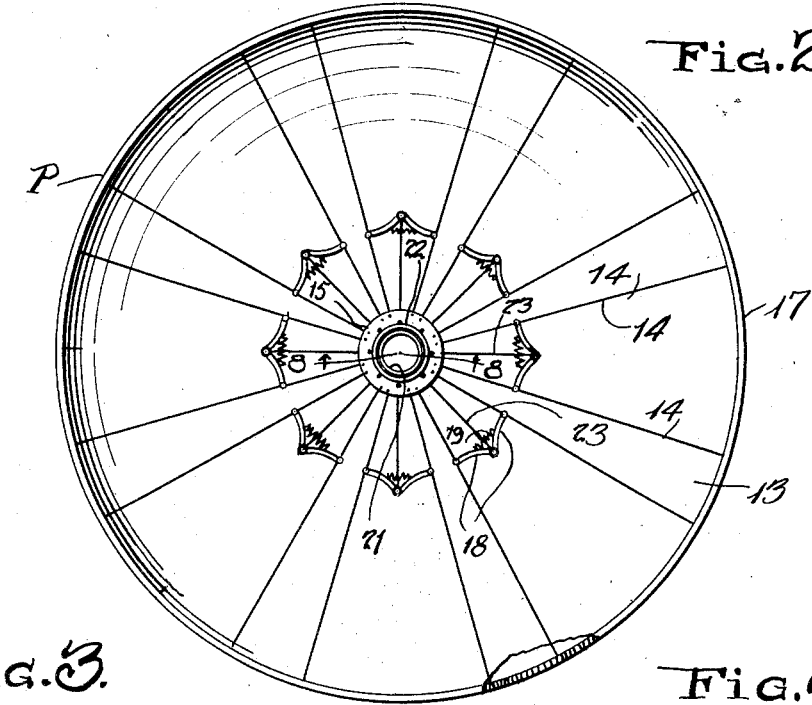
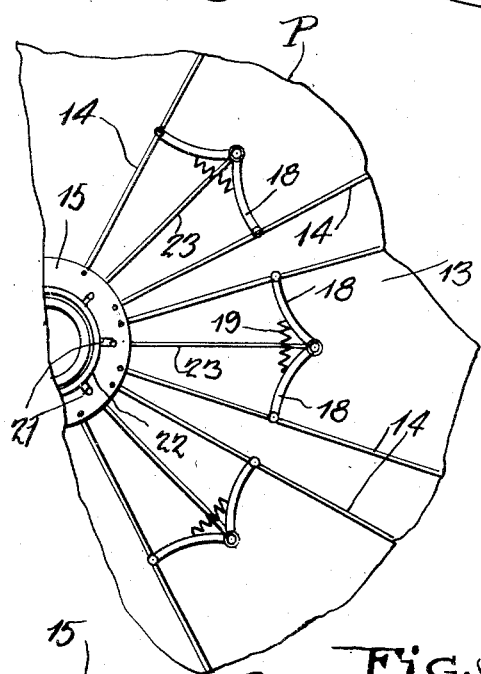
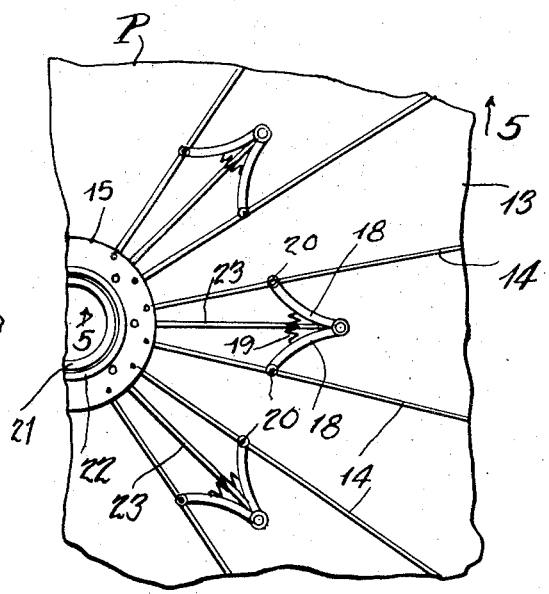
Inventor
F. W. Denda
By Bryant & Lowry
Attorneys July 31, 1928. 1,679,242

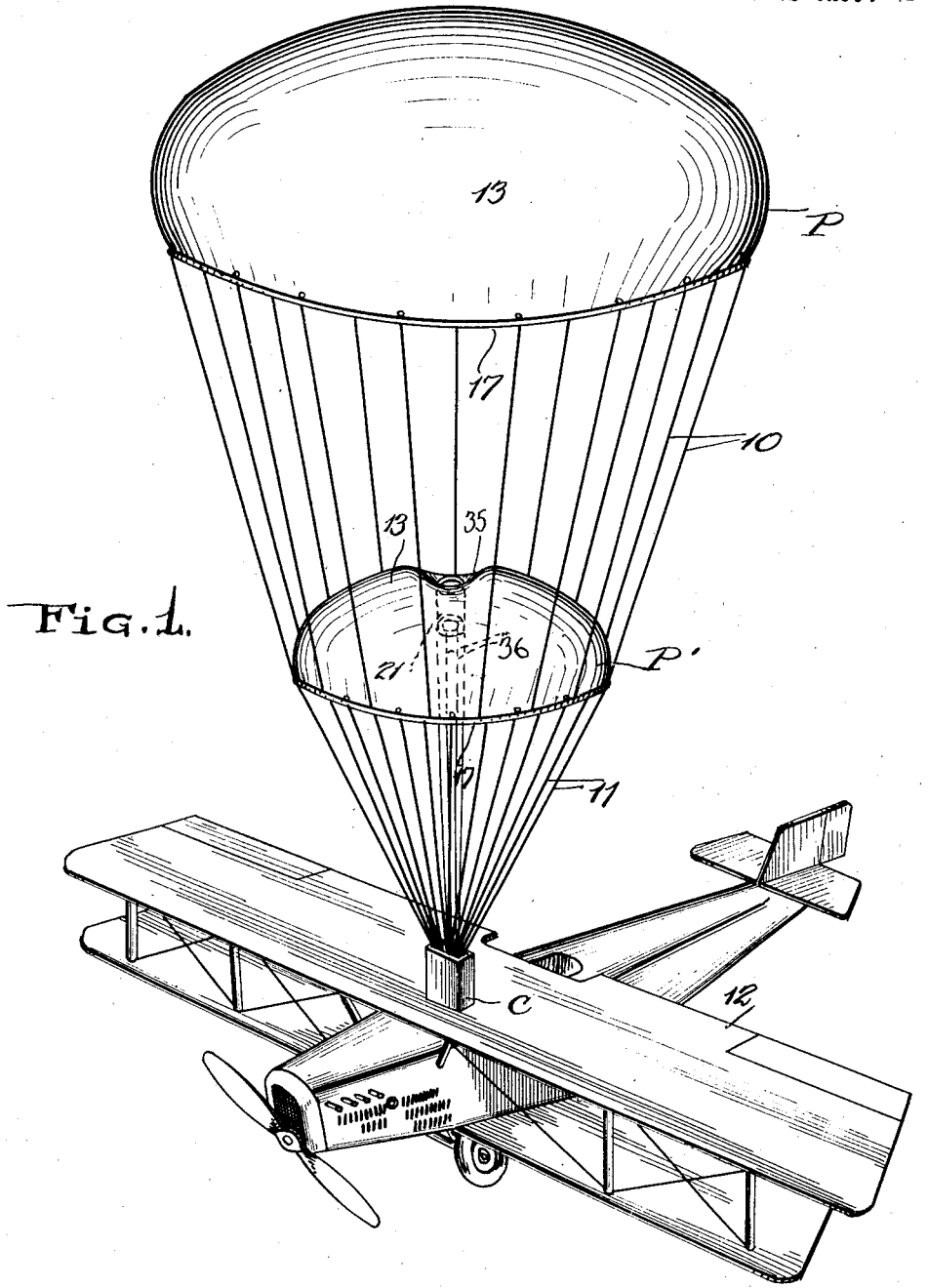

F. W. DENDA

PARACHUTE

Original Filed Nov. 20, 1926   3 Sheets-Sheet 3

Inventor
F. W. Denda.
By Bryant & Lowry
Attorneys

Patented July 31, 1928.

1,679,242

UNITED STATES PATENT OFFICE.

FRIEDRICH WILHELM DENDA, OF CLEVELAND, OHIO.

PARACHUTE.

Application filed November 20, 1926, Serial No. 149,608. Renewed March 30, 1928.

This invention relates to aerial apparatus or aeronautics, and has more particular reference to parachutes and apparatus for the operation thereof.

The primary object of the invention is to provide an improved apparatus readily applicable to air aircrafts of any type to assist in controlling the descent of such aircraft in case of accident whereby the ordinary means for accomplishing a safe descent of the aircraft are incapacitated.

Specific objects of the invention are to provide for the proper distension of the parachute as well as the proper stowing away of the apparatus in a most compact form when the same is in an inoperative position.

A further object is to provide means for positively locking the parachute and projecting apparatus in a retracted position and operable for insuring a quick release of the projecting apparatus.

A still further object is to provide means for a most expeditious and positive projection and distension of the parachute when released.

With the above general objects in view, and others that will become apparent as the nature of the invention is better understood, the same consists in the novel form, combination and arrangement of parts hereinafter more fully described, shown in the accompanying drawings and claimed.

In the drawings wherein like reference characters indicate corresponding parts throughout the several views, Figure 1 is a perspective view of an aeroplane equipped with a parachute apparatus constructed in accordance with the present invention, the parachutes being in distended and projected condition;

Figure 2 is an inner or bottom plan view showing the body and associated parts of one of the parachutes illustrated in Figure 1;

Figure 3 is an enlarged fragmentary bottom plan view of a portion of the device shown in Figure 2 in fully distended condition;

Figure 4 is a view similar to Figure 3 with the parts in partially collapsed condition;

Figure 5 is a sectional view taken substantially upon line 5—5 of Figure 4;

Figure 6:
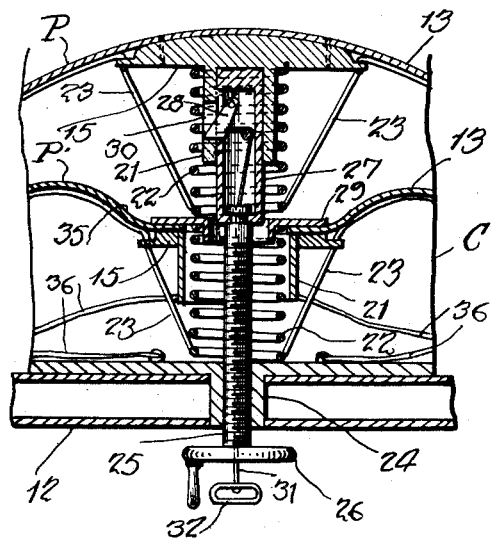
Figure 6 is an enlarged fragmentary vertical section through the upper plane of the aeroplane shown in Figure 1, and the adjacent portion of the receptacle or container in which the parachutes are stowed when not in use, the parachutes being locked in the container and disposed as the same appear prior to tensioning or compressing the parachute projecting springs.

Referring more in detail to the drawings, the present invention embodies a main or upper relatively large parachute P, and one or more auxiliary lower parachute or parachutes, one of which is illustrated and indicated at P'. As shown, the lower parachute is somewhat smaller than the upper one, and these parachutes are adapted to assume spaced superimposed relation when projected and distended, the two being connected for limited separation and free nesting, by means of marginal connecting ropes 10 arranged in a circular series and at uniform intervals at the marginal edges of the parachutes. The lower parachute P' is flexibly connected to a support by means of a circular series of guy ropes 11 which are attached at uniform intervals to the marginal edge of said lower parachute and depend in converging relation where they are attached at their lower ends to a suitable support, which, in the instance illustrated, comprises the bottom wall of a receptacle or container C within which the parachutes and parts carried thereby are adapted to be stowed when not in use. When the present invention is employed upon an aeroplane, the container C is fixed centrally upon the carrying plane 12 of said aeroplane as shown in Figure 1, the plane 12 being the upper one of a bi-plane.

From the above it will be seen that the parachutes may be collapsed and stowed away within the container C when not in use, the parachutes being in position for convenient and effectual release and distension to the position of Figure 1 so as to retard the descent of the aeroplane in case the ordinary means for accomplishing a safe descent of the aeroplane, such as the wings, propeller, etc., are incapacitated, thereby avoiding injury and destruction.

The parachutes are of generally similar construction, and each embodies the usual envelope or body 13 of canopy form and constructed of suitable flexible material or fabric. The body or envelope 13 of each parachute is reinforced by a circular series of flexible ribs or ropes 14 arranged in pairs radially of and at the underside of said body. These rib ropes 14 are suitably attached at their outer ends to the marginal edge of the body 13 and at their inner ends to the margin of a plate or disk 15 suitably attached to the under side and centrally of the body 13 of the parachute. The rib ropes 14 are preferably attached to the body 13 throughout their lengths.

Figure 7:
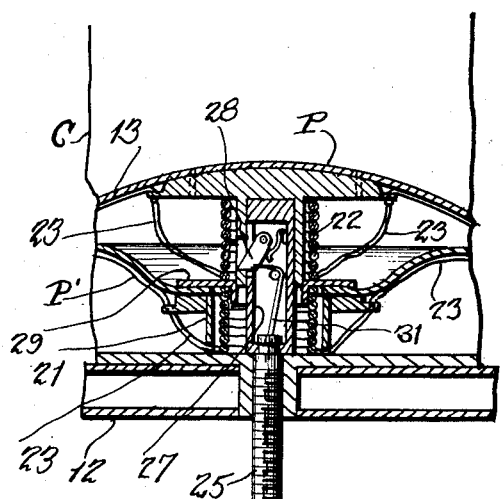
Figure 7 is a view similar to Figure 6 with the parachute projecting springs tensioned or compressed.
Figure 8:
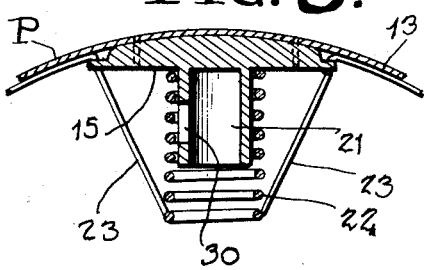
Figure 8 is an enlarged fragmentary sectional view taken substantially upon line 8—8 of Figure 2.
Figure 9:
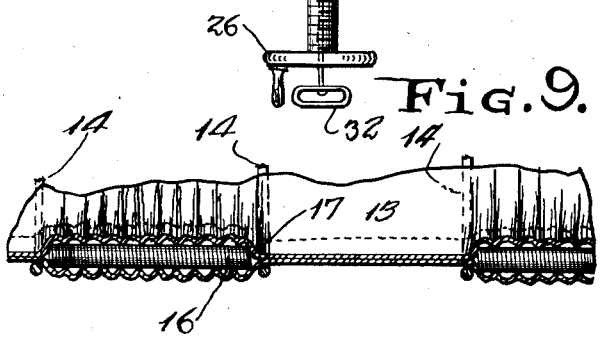
Figure 9 is a fragmentary sectional detail view illustrating the manner of providing distending springs in the marginal edges of the parachute bodies, the springs being in compressed or collapsed condition.
Figure 11:
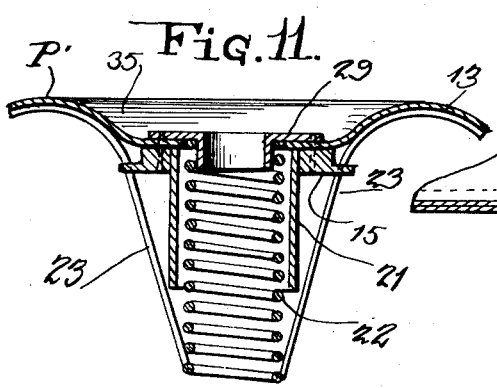
Figure 11 is a view somewhat similar to Figure 8 of the lower parachute of Figure 1.
Figure 10:
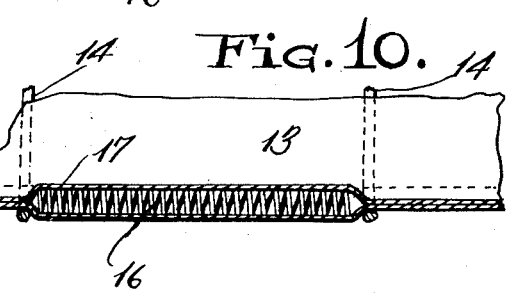
Figure 10 is a view somewhat similar to Figure 9 with the illustrated spring expanded and the associated parachute body portion distended.

Means is provided for normally yieldingly distending the body 13 of each parachute, and these means preferably consist in arcuately-shaped helical expansion springs 16 secured at intervals in the marginal hem 17 of the body 13 as best shown in Figures 9 and 10. The springs 16 thus act to distend the major portion of the body 13 at its margin, the springs being in normal expanded position as illustrated in Figure 10, but being capable of compression for permitting efficient collapse of the body 13 when the parachute is stowed away, as indicated in Figure 9. The contraction of the springs 16 causes the formation of folds in the body 13 so that the parachute may be sufficiently collapsed to be accommodated in the container C when stowed away and not in use. The other means for normally acting to distend the body 13 consists in a plurality of spring devices, one of which is associated with each pair of rib ropes 14 as best seen in Figures 2 to 4 inclusive. As shown, each spring device consists of a pair of pivotally connected links 18 normally swung apart by means of a helical compression spring 19 suitably connected at its ends to and interposed between the intermediate portions of the links. As shown, the free end of one link is pivoted as at 20 to one rope 14 of the pair, while the free end of the other link is similarly pivoted to the other rope of said pair, the pivotal connections 20 being at opposed points intermediate the ends of the pair of ropes 14 so that the spring devices will serve to normally distend the major portion of the body 13 intermediate the center and marginal edge of the latter. In order to assist the springs 19 in expanding the spring devices composed of links 18, I provide means, operable upon projection of the parachute from the container C, for exerting an inward pull upon the pivotal connections between the pairs of links 18, the expansion of the pairs of links necessarily ensuing in view of the fact that the links of each pair are normally arranged in outwardly converging relation. As shown, each disk 15 is provided with a depending sleeve 21 concentric with which is a helical compression spring 22 attached to and depending from the disk 15 as well as having a normal length considerably greater than that of the associated sleeve 21 as indicated in Figures 3 and 11 as well as Figure 6. Attached to the lower end of each spring 22 are the ends of a plurality of ropes 23 which pass upwardly through marginal guide openings provided in the associated disk 15, and then pass outwardly radially of the body 13 where they are attached at their outer ends to the hinge joints of the respective pairs of links 18. As will presently become apparent, means are provided for compressing and retaining under compression the springs 22 when the parachutes are stowed away, so that slack is normally had in the ropes 23 and the collapsing of the links 18 of the spring devices permitted as indicated in Figure 4 and Figure 7. Thus, when the disks 15 are released the springs 22 will expand for projecting the parachutes out of the container C, and at the same time the ropes 23 will be pulled by said springs 22 so as to aid the springs 19 in expanding the links of the spring devices. At the same time, the springs 16 will expand and it will accordingly be apparent that nearly complete distension of the parachutes is substantially positively effected as soon as the parachutes pass out of the container C, whereby the parachutes almost immediately have a sustaining action upon the aeroplane. The air resistance against the undersides of the parachute bodies will quickly relieve the latter of any remaining folds such as allowed by the spacing of the springs 16 and the spring devices composed of links 18. It is to be noted that each spring 16 is arranged to extend from the outer end of one rope 14 of each pair to the outer end of the other rope of said pair, whereby radial folds may be provided in the parachute bodies from the center to the edges thereof when said parachutes are collapsed.

As shown, the disk 15 and the body 13 of the upper parachute are imperforate, while the disk 15 and body 13 of the lower parachute are provided with registering central openings surrounded by the associated spring 22. The support or the floor of the container C is provided with a central opening which registers with the threaded bore of a depending sleeve or nut member 24 rigid with said support or floor and passing through an opening in the plane 12. Passing through and having threaded engagement in the sleeve or nut 24 is an adjusting screw 25 which is equipped at its lower end within convenient reach of the driver or a passenger of the aeroplane, with a suitable handle or hand wheel 26, by means of which the screw 25 may be conveniently rotated. Swiveled on the upper end of and co-axial with the screw 25 is a hollow stem 27 provided with a side slot through which normally projects a spring projected pivoted catch or locking element 28 which is pivoted at its upper end. The sleeves 21 and springs 22 are of sufficient diameter to freely permit the passage of the stem 27 and screw 25 into the same, and it will thus be seen that the lower disk 15 and its associated sleeve 21 may be passed downwardly onto the adjusting screw as illustrated in Figure 6 and the sleeve 21 of the upper disk 15 then engaged over the stem 27. When the parts are thus positioned the upper spring 22 will bear upon the cap plate 29 of the lower disk 15, while the lower spring 22 will bear upon the support or the floor of the receptacle C. The upper sleeve 21 is provided with a side slot 30 into which the latch 29 is adapted to snap when said upper sleeve 21 is placed over the stem 27 so that the parachutes are effectively retained in the container. It is then apparent that when the adjusting screw 25 is turned for threading the same downwardly from the position of Figure 6 to the position of Figure 7, the parachutes will be more tightly compacted in the container and the springs 22 will be placed under compression. This effects the above mentioned slack in the ropes 23 for permitting the full collapse of the parachutes by reason of permitting the collapse of the spring devices embodying the links 18. It will also condition the apparatus for quick release and projection of the parachutes so that the springs 22 will effectively project the latter out of the container C immediately upon release of the latch 28. The screw 25 is preferably hollow and open at its ends, and in order to permit convenient release of the latch 28 a flexible member or cord 31 is passed through the screw 25 into the stem 27 where it is attached at its upper end to the free end of the latch 28, the lower end of the cord 31 depending slightly below the handle or hand wheel 26 where it is equipped with a suitable hand grip or handle 32. Thus, upon pulling downwardly upon the handle 32 the cord 31 will be pulled to retract or release the latch 28 so that the springs 22 will project the parachutes from the container.

It is obvious that many minor changes may be made without departing from the spirit and scope of the invention, and among these changes may be included the obvious possibility of providing more than one small or auxiliary parachute P'. The number of parachutes and their relative sizes or respective sizes will depend greatly upon the particular nature, weight, etc., of the device to be sustained. It is also apparent that the support need not necessarily constitute the floor of a container or of a container fixed upon an aeroplane or other aircraft. As an example, the support may consist of any part of a body harness in case the invention is desired for personal use.

From the foregoing description it is believed that the construction and operation as well as the advantages of the present invention will be readily understood and appreciated by those skilled in the art. In order to facilitate stowing of the parachutes, the lower parachute P' is formed with a central depressed portion 35 which furnishes a seat for the upper spring 22 as shown in Figs. 6 and 7. This depression is maintained by guy ropes 36.

What I claim as new is:—

1. In combination, a container, a plurality of flexibly connected parachutes adapted to be stowed in superimposed relation within the container when collapsed, a spring associated with each parachute for projecting it out of the container, and means engageable with the uppermost parachute for releasably retaining said parachutes within the container against the action of their projecting springs.

2. In combination, a container, a plurality of flexibly connected parachutes adapted to be stowed in superimposed relation within the container when collapsed, a spring associated with each parachute for projecting it out of the container, and means engageable with the uppermost parachute for releasably retaining said parachutes within the container against the action of their projecting springs, said retaining means being operable for compacting the parachute in the container simultaneously tensioning said springs.

3. In combination, a container, a plurality of flexibly connected parachutes adapted to be stowed in superimposed relation within the container when collapsed, a spring associated with each parachute for projecting it out of the container, and means engageable with the uppermost parachute for releasably retaining said parachutes within the container against the action of their projecting springs, said retaining means embodying an adjusting screw adjustable through the bottom of the container for tensioning said projecting springs.

4. In combination, a container, a collapsible parachute attached to and adapted to be stowed in the container when collapsed, a spring for projecting the parachute out of the container, and means operable by said spring when projecting the parachute for assisting distension of the latter, said last named means embodying expansible devices associated with the body of the parachute and operatively connected to said spring.

5. In combination, a container, a collapsible parachute attached to and adapted to be stowed in the container when collapsed, a spring for projecting the parachute out of the container, and means operable by said spring when projecting the parachute for assisting distension of the latter, said last named means embodying pairs of hingedly joined links associated with the body of the parachute and flexible connections between the joints of the links and said spring.

6. In combination, a support, a collapsible parachute having a central keeper member and a depending compression spring, means engageable with said keeper member for retaining the parachute in collapsed condition on the support, and means to move said retaining means toward the support for compressing said spring.

7. In combination, a support, a collapsible parachute having a central keeper member and a depending compression spring, means engageable with said keeper member for retaining the parachute in collapsed condition on the support, means to move said retaining means toward the support for compressing said spring, and an auxiliary lower parachute to which the first named parachute is flexibly connected, said lower parachute having a central opening and provided with a depending compression spring adapted to be compressed upon such movement of the retaining means, said retaining means adapted to pass through said central opening to engage the keeper member.

In testimony whereof I affix my signature.

FRIEDRICH WILHELM DENDA.